Figure 1:
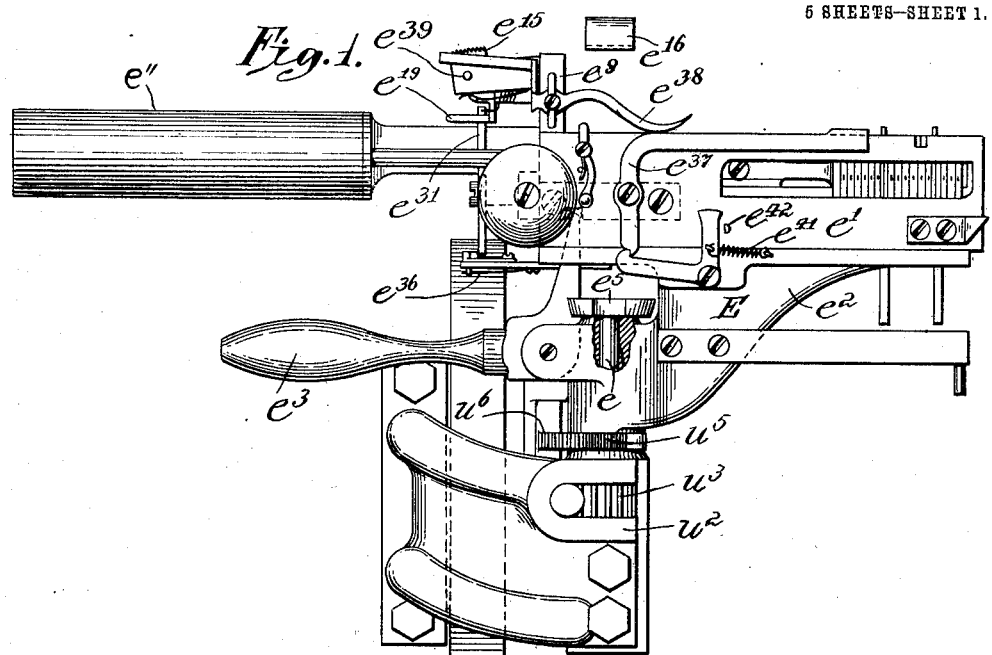

W. H. SCHARF.
LINOTYPE MACHINE.
APPLICATION FILED DEC. 19, 1904.

1,005,324.

Patented Oct. 10, 1911.

5 SHEETS—SHEET 1.

Witnesses
Inventor
Wm. H. Scharf
By his Attorneys

W. H. SCHARF.
LINOTYPE MACHINE.
APPLICATION FILED DEC. 19, 1904.
1,005,324.
Patented Oct. 10, 1911.
5 SHEETS—SHEET 2.
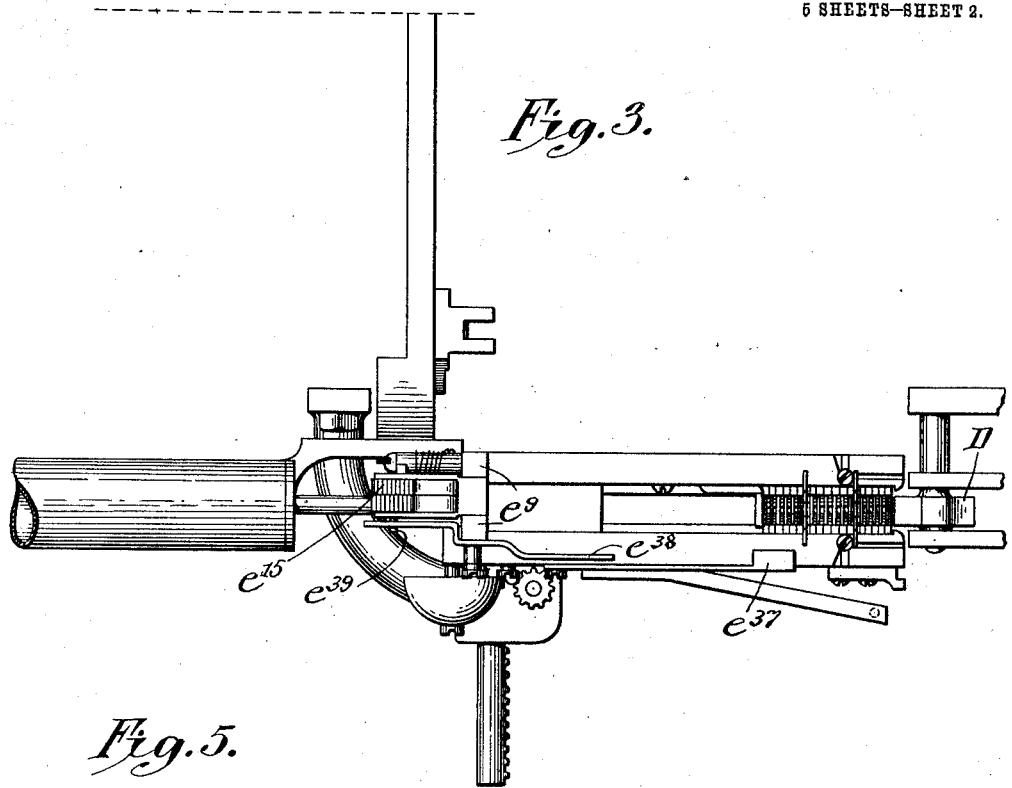
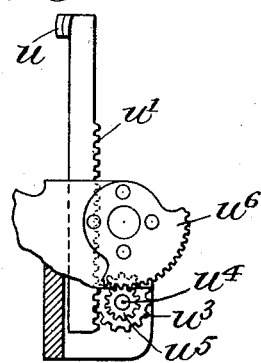
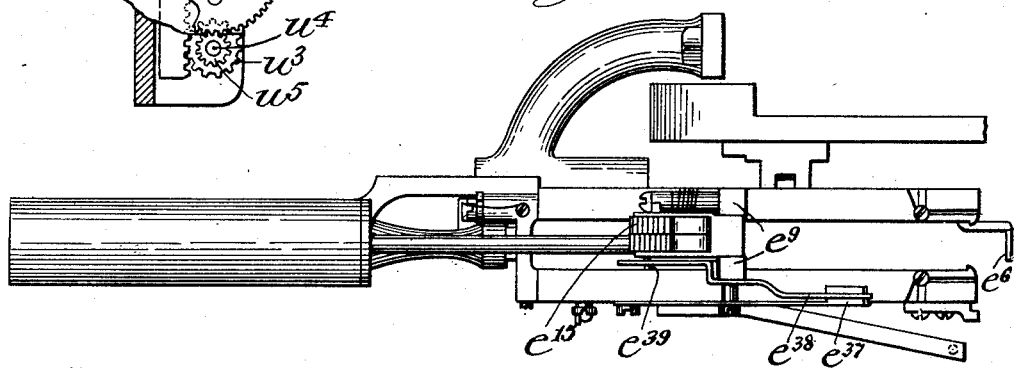

W. H. SCHARF.
LINOTYPE MACHINE.
APPLICATION FILED DEC. 19, 1904.

1,005,324.

Patented Oct. 10, 1911.
5 SHEETS—SHEET 3.

Witnesses
Edgeworth Greene
H. N. Jesbera

Inventor
Wm. H. Scharf
By his Attorneys
Sturtevant & Hurry

W. H. SCHARF.
LINOTYPE MACHINE.
APPLICATION FILED DEC. 19, 1904.

1,005,324.

Patented Oct. 10, 1911.

5 SHEETS—SHEET 4.

Witnesses
Edgworth Greene
A. N. Jesbera

Inventor
Wm. H. Scharf
By his Attorneys
Sturtevant & Greeley

W. H. SCHARF.
LINOTYPE MACHINE.
APPLICATION FILED DEC. 19, 1904.
1,005,324.
Patented Oct. 10, 1911.
5 SHEETS—SHEET 5.
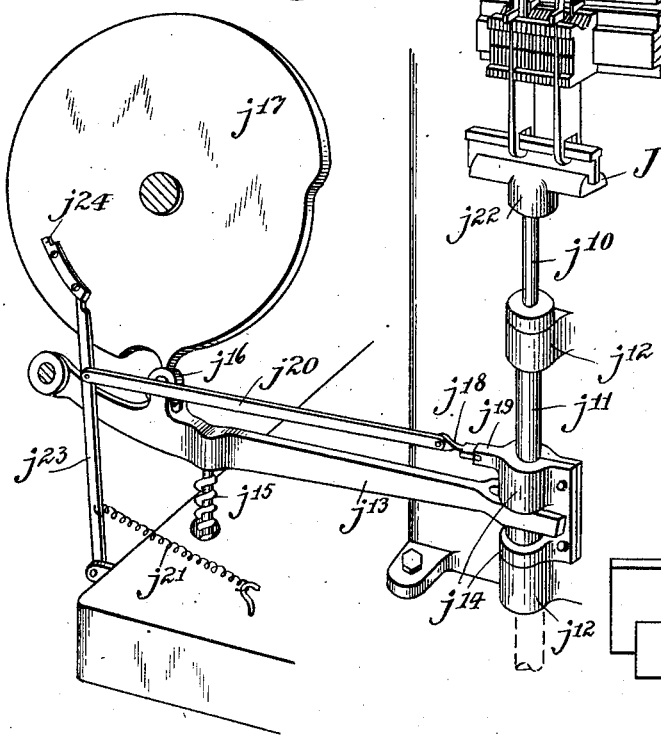
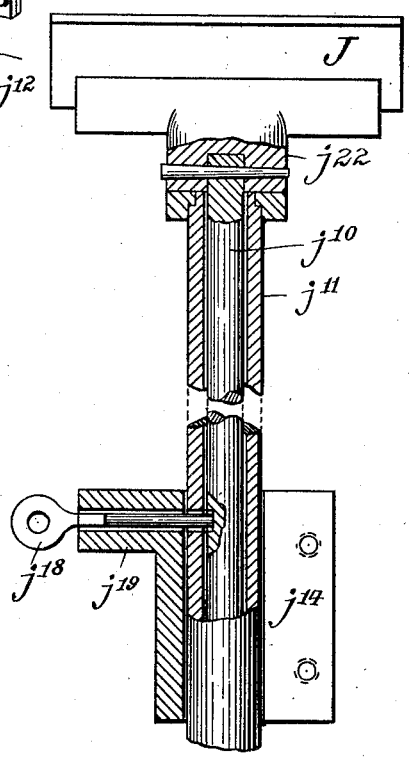

UNITED STATES PATENT OFFICE.

WILLIAM HERMANN SCHARF, OF MONTREAL, QUEBEC, CANADA, ASSIGNOR, BY MESNE ASSIGNMENTS, TO MERGENTHALER LINOTYPE COMPANY, OF NEW YORK, N. Y., A CORPORATION OF NEW YORK.

LINOTYPE-MACHINE.

1,005,324. Specification of Letters Patent. Patented Oct. 10, 1911.

Application filed December 19, 1904. Serial No. 237,427.

*To all whom it may concern:*

Be it known that I, WILLIAM HERMANN SCHARF, a resident of the city of Montreal, in the Province of Quebec, Dominion of Canada, have invented certain new and useful Improvements in Linotype-Machines, of which the following is a specification, reference being had to the accompanying drawings, forming a part hereof.

This invention relates to linotype machines, and one of its objects is to simplify such machines with a view particularly toward making the operation thereof more automatic and convenient.

In Letters Patent of the United States No. 734,746, dated April 28th, 1903, applied for by me jointly with one David A. Poe there is illustrated and described a linotype machine, in which, as soon as the line of matrices and the spacers is assembled in the assembler, the latter is turned from its receiving position through a right angle to its discharging position substantially in front of the mold. In order to effect this operation, the operator grasps a handle or lever which he depresses to release the assembler, the latter, while receiving the matrices and spacers, being interlocked with the keyboard and magazine mechanism, and, after turning the assembler through this handle or lever, he moves a second lever upon the assembler in order to place the assembled line under the control of an actuating or operating bar which draws it from the assembler into the casting mechanism. Subsequently, and before the assembler is returned to its first position by a backward movement of the handle, he moves a third lever in order to disengage the sliding parts of the assembler from the operating bar. All of these operations, as will more clearly appear upon reference to the Letters Patent above recited, involve the grasping of several levers in a particular sequence, and it will be obvious that careful attention must be given to these operations if they are to be effected in the proper way. In accordance with the present invention, these several operations, which have been referred to in connection with the machine illustrated and described in the above recited Letters Patent, but which are generally common to all linotype machines, may be effected through one lever or handle.

Further objects of the invention consist in providing new mold wiping means for such machines, and in improving the construction of the justifying means, all of which will be described in detail in the description below and in connection with the accompanying drawings.

Figure 2:
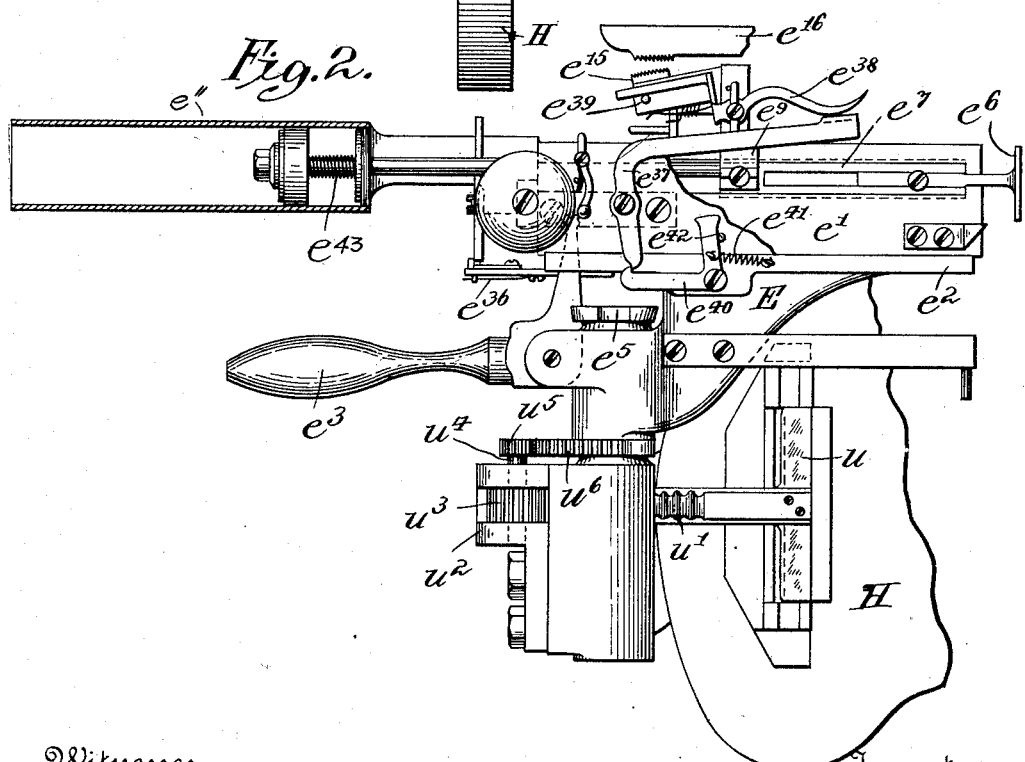
Figure 6:
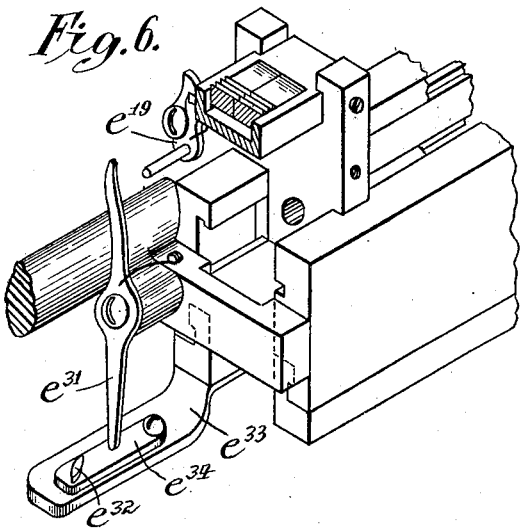
Figure 9:
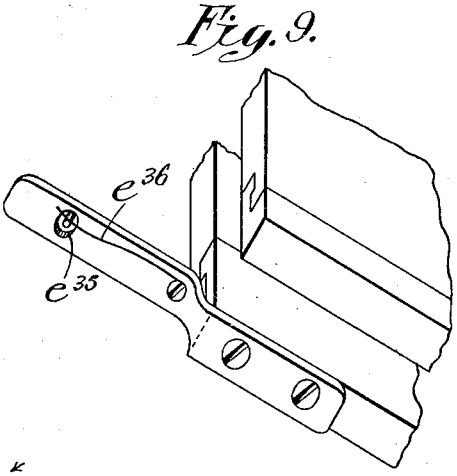
Figure 7:
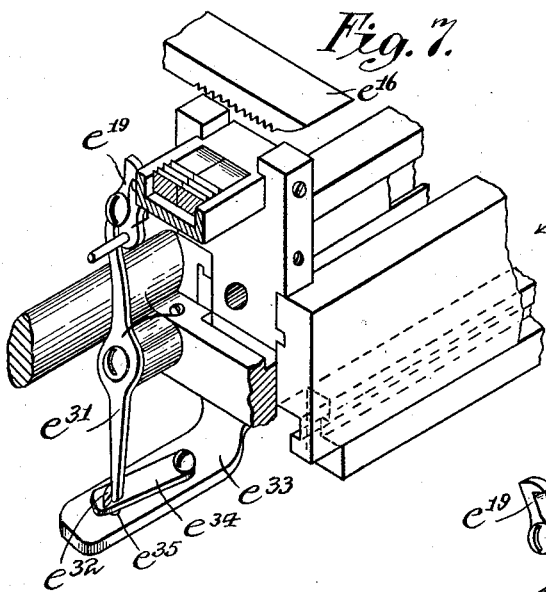
Figure 8:
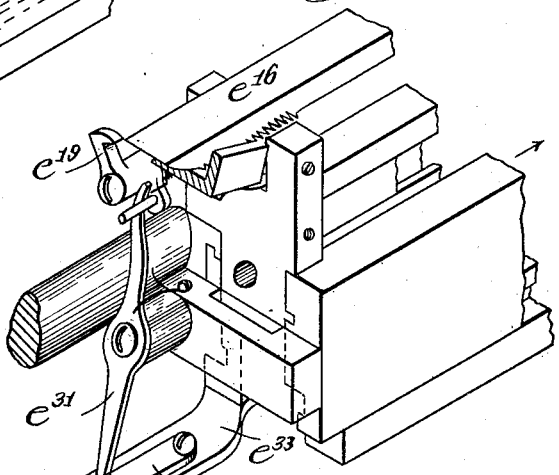
Figure 10:
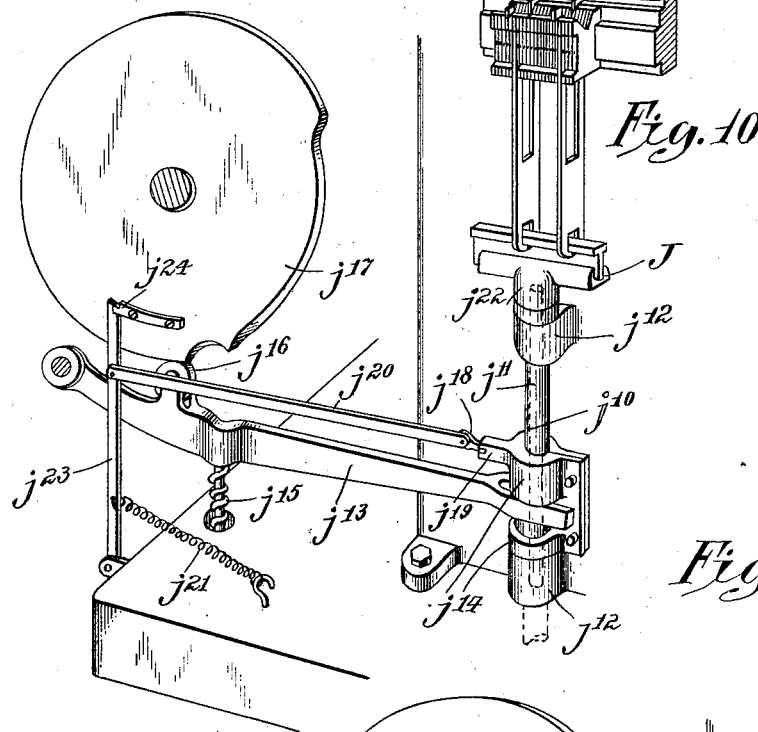
Figure 11:
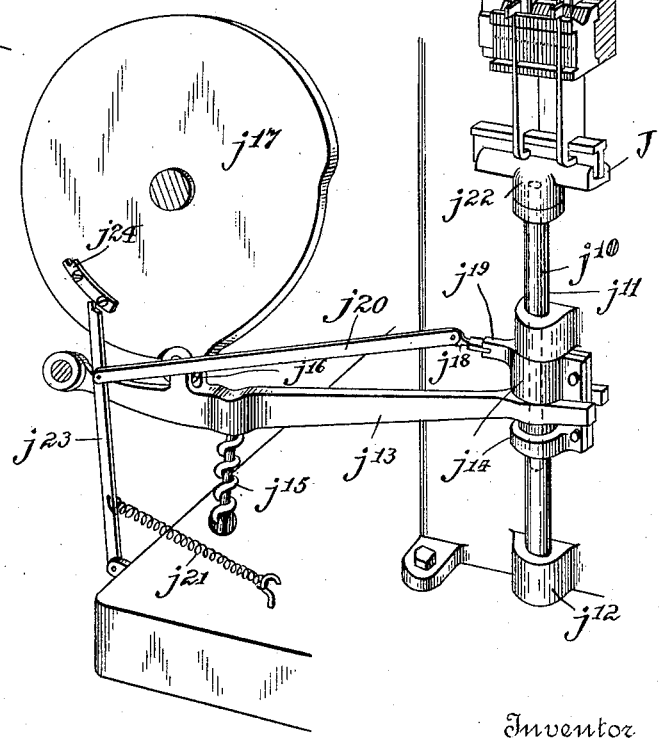

In the drawings the invention is illustrated as applying to a linotype machine of the general character illustrated and described in the Letters Patent above mentioned, and Figure 1 is a view in front elevation of the assembler in such a machine, said assembler containing some of the improvements referred to, and being shown in its initial or receiving position; Fig. 2 is a similar view showing the assembler in its discharging position substantially in front of the mold. Figs. 3 and 4 are plan views of the assembler corresponding respectively to the views shown in Figs. 1 and 2, the end of the key board and magazine mechanism being shown in Fig. 3. Fig. 5 is a detail view of the mold wiping device. Figs. 6, 7 and 8 are perspective views of the rear end of the assembler, showing particularly the different positions of the assembler as the sliding portion thereof is drawn in and out. Fig. 9 is a detail view in perspective showing the underside of the rear end of the fixed portion of the assembler. Figs. 10, 11 and 12 are views in elevation of the justifying means, said views showing three different positions of said means, and Fig. 13 is a detail view, partly in section, of the justifying means.

The assembler E is pivoted at $e$ to a fixed part of the machine, and comprises an upper or sliding portion $e'$ and a lower or fixed portion $e^2$. In the position shown in Figs. 1 and 3, the assembler is interlocked with the end of the keyboard portion D from which matrices and spacers may be delivered in any usual or suitable manner thereto, and these matrices and spacers are received in the upper or sliding portion $e'$ of the assembler where they are assembled and constitute, when the assembling operation is finished, the assembled line. As the matrices and spacers are received and as the assembled line is being formed, it is resisted by a finger or resistance $e^6$ on the forward end of a slide $e^7$ and this slide is secured to and forms a part of what are referred to herein as the sliding parts of the assembler. These parts are connected to the piston of a dash pot $e^{11}$ in order to prevent the action of the sliding parts from being too violent when the line is discharged. These sliding parts are mounted in the upper or sliding portion $e'$ of the assembler and serve not only to resist the line as it is being assembled, but also to operatively connect and disconnect the assembled line from the operating bar $e^{16}$ whereby the assembled line is discharged from the assembler into the casting mechanism.

As soon as the line has been assembled, the operator grasps a handle or lever $e^3$ pivoted to the lowermost or fixed portion of the assembler. Said lever has a handle portion normally horizontal and an upwardly extending portion, and is pivoted where these two portions come together. The upright portion of the lever $e^3$ engages the sliding portion $e^1$ of the assembler and by depressing the handle $e^3$, the sliding portion of the assembler is drawn back from engagement with the keyboard or magazine mechanism and the lever $e^3$ is at the same time drawn out of engagement with a notch $e^5$ formed in a fixed part of the machine. The assembler is now free to be moved upon its pivot and, the operator still retaining hold of the handle $e^3$, may turn the same to its discharging position which is substantially in front of the mold and in the present case substantially at right angles to the first or receiving position.

When the assembler is brought into its second or discharging position it is directly under the operating bar $e^{16}$. The underside of said bar is provided with a rough or serrated surface which is adapted to be engaged by a pawl or series of pawls $e^{15}$ pivoted upon a friction slide $e^9$ and normally held in a depressed position by a latch $e^{19}$ against the action of an underlying spring. The parts just referred to, namely the pawl, friction slide and spring constitute some of the sliding parts hertofore referred to.

When the assembler is turned from its receiving position to its discharging position, the pawl $e^{15}$ is held down in its depressed position by the latch $e^{19}$. On the rear end of the sliding portion a lever $e^{31}$ is pivoted, the lower end of which is adapted to ride over a cam $e^{32}$ provided upon an extension piece $e^{33}$ which is secured to the fixed part of the assembler. This cam (Figs. 6, 7, 8 and 9) consists of an elongated strip secured crosswise to a piece $e^{34}$ which is pivoted to the extension $e^{33}$. A pin or projection secured to the pivoted piece $e^{33}$ extends through an opening $e^{35}$ in the extension and is engaged by a spring $e^{36}$ on the bottom of the extension whereby the pivoted piece $e^{34}$ is normally held toward one side. As the sliding portion of the assembler is drawn back by the depression of the handle $e^3$ in the first instance the upper end of the lever is in engagement with the latch $e^{19}$ and the lower portion rides over the cam, causing the pivoted piece $e^{34}$ to be moved against the action of the spring $e^{36}$. When the assembler has been turned to its discharging position the operator still retains the handle in its depressed position thus holding the lever $e^{31}$ beyond the cam $e^{32}$, but as soon as the assembler has reached its second or discharging position the operator raises the handle, or, if the handle is provided with a spring to raise it, merely lets go of it, permitting the sliding portion to move back and interlock with the end of the casting mechanism and causing the lever $e^{31}$ to ride across the other side of the cam $e^{32}$. The lever $e^{31}$ is thereby moved and rocks the latch $e^{19}$ thus releasing the pawl $e^{15}$ which is forced upward by its underlying spring to engage with the operating bar $e^{16}$. The operating bar $e^{16}$ which is moved backward and forward by any suitable means now effects the discharge of the assembled line from the assembler into the casting mechanism, all as fully described in the Letters Patent above referred to. As soon as this has been accomplished the sliding parts may be disengaged from the operating bar and the assembler returned to its first position.

In order to bring about the release of the sliding parts from the operating bar $e^{16}$, a bell crank lever $e^{37}$ is provided upon the sliding portion of the assembler, the upper end of which is adapted to engage, when the assembler is empty, and the sliding parts are in their forward position, (Figs. 2 and 3), one end of a lever $e^{38}$ pivoted upon the friction slide $e^9$, the other end of the lever $e^{38}$ engaging a pin $e^{39}$ on the pawl $e^{15}$. On the fixed part of the assembler is pivoted another bell crank lever $e^{40}$ which is held in its normal position by a spring $e^{41}$ against a limiting pin $e^{42}$. One end of this lever is adapted to engage the lower end of the lever $e^{37}$. When, therefore, the assembled line has been discharged into the casting mechanism, and the sliding parts are in the position shown in Fig. 2, the operator again depresses the handle $e^3$ thereby drawing back the sliding portion of the assembler, together with the lever $e^{37}$ and the lower end of this lever being engaged by the lever $e^{40}$, the upper end thereof is raised and acts upon the lever $e^{38}$ causing it to depress the pawl $e^{15}$ from its engagement with the actuating bar $e^{16}$. The pawl $e^{15}$ is then caught and held by the spring actuated latch $e^{19}$ and the assembler may now be turned by the handle $e^3$ to its first position.

It will thus be seen that the handle $e^3$ not only serves to effect the movement of the assembler from one of its positions to the other of its positions, but that a vertical movement of the handle $e^3$, when the assembler contains an assembled line, serves to operatively connect the sliding parts of the assembler with the actuating bar and that a vertical movement of the handle $e^3$ when the assembler is empty serves to disconnect the sliding parts of the assembler from the operating bar.

It should be noted that when the sliding parts have effected the discharge of a line from the assembler, the end $e^6$ of the resistant would project out from the end of the assembler and would be in the way of adjacent parts in turning the assembler back to its first position, were it not for the provision of means, as in the present case, for drawing in the end of the resistant automatically. These means will be seen to comprise (Fig. 2) a spring $e^{43}$ coiled around the stem of the plunger in the dash pot, and resting between the piston of the dash pot and the forward end thereof. As soon as the bar $e^{16}$ has operated to deliver the line from the assembler and has moved toward the forward part of the machine again, the pawl $e^{15}$ is disengaged therefrom and the spring $e^{43}$ then extends itself, drawing with it the sliding parts including the resistant $e^6$.

In Fig. 2 the mold is partially shown at H. It is practically a requisite in every linotype machine that some means be provided for cleaning away from the face of the mold any pieces or scraps of metal which are left there after the casting and discharge of the slug. If this is not done the next line of matrices and spacers will not fit down squarely against the face of the mold and as a consequence the next slug will be formed with feathers or burs rendering it absolutely unfit for use.

In linotype machines heretofore it has been customary to provide a stationary wiper for the mold whereby, as the mold moved, it would encounter the wiper in some position and its face would pass over it in the direction of its length and the loose scraps of metal would be pushed from one end of the face to the other and off therefrom.

In many linotype machines, it is very inconvenient to have a stationary part, such as a wiper, placed in the path of the mold, for the reason that it interferes with the compactness of the machine and for the further reason that there is often no suitable part to which to attach such stationary wiper. Furthermore, the continuous pressing of the mold against the wiper serves to work it loose and therefore render it useless, and where it is spring-supported to avoid this difficulty, the same pressure of the mold soon works the spring out of adjustment or breaks them. Again, with a stationary wiper, the mold can only be wiped once after each casting, unless it is particularly timed to pass back and forth over the wiper during one complete cycle of operations, which is by no means an easy matter.

In the present instance, to avoid all these objections, a movable wiper is provided to wipe the mold. The wiping is done in the present case when the mold is stationary, and it is obvious that the mold may be held stationary in any desirable position. The wiper being movable it can be easily withdrawn from its wiping position so that it need never occupy any particular position such as must be the case with a stationary wiper which must be placed somewhere in the path of the mold. Furthermore, the wiper may be caused to be drawn over the face of the mold as often as is desired without any necessity of timing the mold and of interfering in any way with the operation of the various parts of the machine, which, it is obvious, must be timed with respect to each other.

In order that the wiper shall have a minimum of movement and thereby require a minimum of space for its operations, it is provided to wipe across the face of the mold instead of along the length of the mold and this is also preferable because the scraps of metal are not brushed over the entire face, as is the case when the wiper operates longitudinally of the face, but are brushed off the side of the face and the face is thereby more thoroughly cleaned.

Referring now to Fig. 2, the wiper $u$ will be seen to be secured to the rack $u'$. The rack moves in a guide $u^2$ in the frame of the machine, a pinion $u^3$ on a shaft $u^4$ being provided to mesh with the rack. On the upper end of the shaft $u^4$ is a pinion $u^5$ which meshes with a sector $u^6$ secured to the lower end of the assembler. It will thus be seen that as the assembler is turned from one of its positions to the other of its positions the wiper will be drawn across the face of the mold and that as the assembler is moved from one of its positions to the other of its positions and back again, the wiper will be moved forward and backward across the face of the mold. Moreover, the wiper is thus drawn across the mold at right angles to its length and between the projections $h$ at each end of the mold between which the line is held during casting and which therefore limit the line during casting.

In order to justify the assembled line when it is in position in the casting mechanism in front of the mold, the wedge-shaped spacers as usual are provided and are driven upward between the matrices so that the line may be expanded against the inclosing sides of the mold. The upper end of the bar J is of T-form in cross-section and the lower end of the spacer wedges contain corresponding notches, and as heretofore, when the assembled line is discharged into the casting mechanism from the assembler, these notches in the spacers embrace the upper edge of the bar J. As a general rule, in order to effect the justification, the bar J is driven upward and allowed to drop again, carrying the spacers with it and then driven upward a second time and held. The rod to which the bar J is secured is made in two parts, the lower part of which is separable from the upper part which carries the bar J. When the rod is driven up the first time, the two parts are connected, but after it has been driven up, the parts are detached from each other by the operation of suitable mechanism and the bar J remains in its uppermost position together with the spacers while the lower portion of the rod drops and is driven up forcibly against the bar a second time. In order to effect this result, the actuating mechanism for the bar J is loosely connected thereto by a rod which has two portions, an inner portion $j^{10}$ which is secured to the bar and an outer or sleeve portion $j^{11}$. The bar is held in guides $j^{12}$ and is provided with a lever $j^{13}$ having one end forked and embracing the sleeve portion of the bar which is provided with collars $j^{14}$ and the other end pivoted at a suitable point to the frame of the machine. The bar is continually urged upward by a spring $j^{15}$ and is provided with a roller $j^{16}$ adapted to ride upon a cam $j^{17}$ mounted to rotate upon the frame of the machine. A pin $j^{18}$ sliding in a guide $j^{19}$ is adapted to unite the two parts of the rod, (Fig. 13) by extending through an opening in the sleeve portion and into a recess in the inner portion. A lever $j^{23}$ is pivoted to the frame of the machine at one end and its upper end is engaged at intervals by a cleat upon the cam $j^{17}$, and a link $j^{20}$ connects this lever and the pin $j^{18}$, a spring $j^{21}$ being provided to cause the lever and link to force the pin $j^{18}$ normally inward against the rod.

Before the justification takes place the parts are in the position shown in Fig. 10, the bolts $j^{18}$ uniting both parts of the justifying rod. The cleat upon the cam, however, comes in contact at this point with the top of lever $j^{23}$ and forces it back thereby drawing out the bolt from its seat in the rod. The cam is so shaped that simultaneously with this operation it permits the lever $j^{13}$ to be thrown upward by the spring $j^{15}$ thereby driving up the bar J and the spacers. The cam then causes the lever $j^{13}$ to be depressed and the outer or sleeve portion of the rod $j^{11}$ is drawn down leaving the inner portion of the rod, the justifying bar and the spacers in their elevated position, the spacers being tightly wedged in the line and holding up the bar J and the inner portion of the justifying rod to which it is secured. The cam again, almost immediately upon the depression of the lever $j^{13}$ permits it to be raised again and brought up forcibly by the spring $j^{15}$ whereby the sleeve portion of the justifying rod is driven up against the head $j^{22}$ and the spacers are driven farther into the assembled line. At this point the cleat on the cam has passed out of contact with the lever $j^{19}$ and the spring $j^{21}$ acts upon said lever, forcing the bolt $j^{18}$ through the hole in the sleeve portion and into the recess in the inner portion of the rod, said hole, as will be understood, now registering with said recess. Finally, the cam returns the lever $j^{13}$ to its first position and this lever now draws down both parts of the rod, and with it, of course, the justifying bar and the spacers.

The several improvements, it will be clear, may be applied in various types of linotype machines and their use is therefore not restricted to machines of the character shown and described in the Letters Patent of the United States which have been referred to herein. Said Letters Patent were referred to only for purposes of clearness and convenience in description and illustration. Various changes in construction may also be made over the forms of the improvements shown and described herein without departing from the invention.

I claim as my invention:

1. In a linotype machine, the combination of an assembler having sliding parts and means for moving the assembler from its receiving to its discharging position, said sliding parts including a pawl, and a spring latch therefor, and a releasing lever in operative relation with the latch, said means being adapted to draw back the releasing lever whereby the lever may be moved to unlatch the pawl.

2. In a linotype machine, the combination of an assembler having a fixed portion, a sliding portion and sliding parts, means for moving the assembler from its receiving to its discharging position, a cam upon the fixed portion of the assembler, an actuating bar, said sliding parts including a spring pawl and a spring latch therefor normally holding it away from the actuating bar, and a releasing lever for the latch, said means being adapted to draw back the sliding portion whereby the lever will engage the cam release the pawl and permit it to engage the actuating bar.

3. In a linotype machine, the combination of an assembler having a fixed portion a sliding portion and sliding parts, a lever to turn the assembler and engaging the sliding portion thereof, an actuating bar, said sliding parts including a pivoted spring pawl adapted to engage the actuating bar, a lever on the sliding portion, and a lever on the fixed portion of the assembler, whereby as the first named lever moves the sliding part, the lever on the fixed portion will cause the lever on the sliding portion to rock the pawl out of engagement with the actuating bar.

4. In a linotype machine, the combination of an assembler having a fixed portion, a sliding portion and sliding parts, means engaging the sliding portion to turn the assembler, an actuating bar, said sliding parts including a spring pawl and a spring latch normally holding the pawl away from the actuating bar, two levers on the sliding portion for engagement respectively with the latch and pawl, and means upon the fixed portion of the assembler with which said last named levers may engage respectively as the sliding portion is moved by the first named lever.

5. In a linotype machine, the combination of a turning assembler, a mold, and means operatively connected with the assembler to wipe the face of the mold, the mold being stationary while the assembler is turned from its receiving to its discharging position.

6. In a linotype machine, the combination of a turning assembler, a mold, means to wipe the face of the mold, and operative connections between such means and the assembler, the mold being stationary while the assembler is turned from its receiving to its discharging position, whereby as the assembler is turned said means will be drawn across the face of the mold.

7. In a linotype machine, the combination of a turning assembler, a mold, a wiper for the mold, and connections between the wiper and the assembler, the mold being stationary while the assembler is turned from its receiving to its discharging position, whereby the wiper is drawn forward and backward across the mold as the assembler is turned from its receiving to its discharging position and back again.

8. In a linotype machine, the combination of a turning assembler, a mold, a wiper therefor, a rack secured to the wiper, and a pinion turned by the assembler and engaging the rack, the mold being stationary while the assembler is turned from its receiving to its discharging position.

9. In a wedge justifying mechanism, the combination of a pusher to advance the wedges through the line, and means for subjecting the pusher to a yielding pressure to advance the wedges until they are arrested by the resistance of the matrices, and means to thereafter subject the pusher to a blow to seat the wedges more firmly in the line.

10. In a wedge justifying mechanism, a spring actuated pusher to advance the wedges through the matrix line, and means for giving a blow to the advanced pusher to seat the wedges tightly in place.

11. In a wedge justifying mechanism, a spring actuated pusher to advance the wedges through the matrix line, and a cam controlling the advance of the pusher; in combination with a spring actuated striker to act upon the pusher, and means to cause the action of the striker after the first advance of the pusher.

12. In a linotype machine, the combination of a two-part rod for justifying the line, and means for forcing it upwardly, one part of said rod being adapted to carry the spacers, and the other part being separable therefrom after the rod is driven up the first time.

13. In a linotype machine, the combination of a two-part rod for justifying the line, means for forcing it upwardly, the upper part of said rod being adapted to carry the spacers, and means operating to connect the two parts of said rod before the justifying operation and to disconnect the same after the rod has risen the first time.

14. In a linotype machine, the combination of a justifying bar adapted to carry the spacers, a rod having an upper portion secured to the bar and a lower portion separable from the uper portion, means to actuate the lower portion of the rod, and means to connect the two portions of the rod before the justifying operation and to disconnect the same after the bar has risen the first time.

15. In a linotype machine, the combination of a justifying bar, a rod having an inner portion secured to the bar and an inclosing sleeve, a bolt adapted to unite the sleeve and the inner portion of the bar, and means to actuate the sleeve and the bolt.

This specification signed and witnessed this sixth day of December, A. D., 1904.

WILLIAM HERMANN SCHARF.

Signed in the presence of—
ANTHONY N. JESBERA,
ALFRED W. KIDDLE.

---

Copies of this patent may be obtained for five cents each, by addressing the " Commissioner of Patents, Washington, D. C."